(12) United States Patent
Yen (10) Patent No.: US 7,357,361 B2
(45) Date of Patent: Apr. 15, 2008

(54) HANDS-FREE DEVICE CAPABLE OF ADJUSTING AN ANGLE OF ITS MOUNTING SEAT IN ANY DIRECTION AND POSITIONING SAME

(76) Inventor: Shu Chen Yen, #13-3, Alley 2, Lane 150, Yuan Shan Rd., Chung Ho City, Taipei County (TW)

( * ) Notice: Subject to any disclaimer, the term of this patent is extended or adjusted under 35 U.S.C. 154(b) by 67 days.

(21) Appl. No.: 11/377,270

(22) Filed: Mar. 17, 2006

(65) Prior Publication Data

US 2007/0215766 A1 Sep. 20, 2007

(51) Int. Cl.
*A45D 42/14* (2006.01)
(52) U.S. Cl. .................... 248/205.8; 248/205.5
(58) Field of Classification Search ............ 248/309.1, 248/205.8, 205.5, 176.1; 379/433.04, 449, 379/426; 455/557
See application file for complete search history.

(56) References Cited

U.S. PATENT DOCUMENTS

| | | | | |
|---|---|---|---|---|
| 1,877,570 A | * | 9/1932 | Fitz Gerald | ............... 211/69.7 |
| 5,996,950 A | * | 12/1999 | Richter | ................... 248/205.5 |
| 6,193,197 B1 | * | 2/2001 | Lian | ....................... 248/206.2 |
| 6,244,553 B1 | * | 6/2001 | Wang | ...................... 248/278.1 |
| 6,427,959 B1 | * | 8/2002 | Kalis et al. | ............ 248/288.11 |
| 6,663,064 B1 | * | 12/2003 | Minelli et al. | ........... 248/205.5 |
| 7,178,771 B2 | * | 2/2007 | Richter | ................... 248/205.8 |

FOREIGN PATENT DOCUMENTS

| | | |
|---|---|---|
| TW | 487259 | 5/2002 |
| TW | M255819 | 1/2005 |
| TW | M275443 | 9/2005 |

* cited by examiner

*Primary Examiner*—Amy J. Sterling
(74) *Attorney, Agent, or Firm*—Troxell Law Office, PLLC (57) ABSTRACT

A hands-free device capable of adjusting an angle thereof toward any direction and positioning same includes a suction cup including a central, threaded bolt; a swivel mount rotatably mounted on the suction cup; a first turning assembly rotatably mounted on the swivel mount; an arm having one end pivotably formed with the first turning assembly; a second turning assembly including a pivot formed at one end of the arm and adapted to pivot about the first turning assembly; and a mounting seat fixedly formed at the other end of the arm, the mounting seat including a rotatable seat member projected therefrom for securely engaging with a portable electronic device.

6 Claims, 11 Drawing Sheets

HANDS-FREE DEVICE CAPABLE OF ADJUSTING AN ANGLE OF ITS MOUNTING SEAT IN ANY DIRECTION AND POSITIONING SAME

BACKGROUND OF THE INVENTION

1. Field of Invention

The present invention relates to hands-free devices and more particularly to such a hands-free device capable of adjusting an angle of its mounting seat in any direction and positioning same.

2. Description of Related Art

Hands-free devices mounted in automobiles are gaining popularity in recent years. It is typical to mount a PDA (Personal Digital Assistant), a mobile phone, a smart phone, or the like on a mounting seat of a hands-free device installed in an automobile. Conventionally, such hands-free devices are capable of adjusting its angle to fit different individuals.

For example, Taiwanese Utility Model Patent No. M275443 discloses a hands-free device comprising a suction cup based base adapted to secure to a planar surface and having its upper part adapted to turn a limited range on its pivot, an intermediate portion fixedly connected to the base, an upper portion adapted to turn freely about the intermediate portion by gear engagement, and a top mounting seat adapted to turn a limited angle about the upper portion by a toothlike arrangement.

Taiwanese Utility Model Patent No. M255819 discloses a hands-free device for automobile. The hands-free device comprises a suction cup based base adapted to secure to a planar surface and having its upper part adapted to turn freely on its pivot, a top mounting seat adapted to secure to a device (e.g., mobile phone or the like), and an intermediate flexible post interconnected the base and the mounting seat. The post is adapted to bend only a limited range.

Taiwanese Utility Model Publication No. 487259 discloses a hands-free device for fastening a mobile phone in an automobile. It is characterized in that a bowl shaped member rotatably disposed between a base and a mounting seat. Hence, the mounting seat is adapted to pivot a limited angle about the base by manipulating the bowl shaped member. Thus, continuing improvements in the exploitation of hands-free device are constantly being sought in order to overcome the inadequacies of the prior art.

SUMMARY OF THE INVENTION

It is therefore an object of the present invention to provide a hands-free device capable of easily adjusting an angle of its mounting seat in any direction and positioning the same.

To achieve the above and other objects, the present invention provides a hands-free device capable of adjusting an angle thereof toward any desired direction and positioning the same comprising a suction cup including a central, threaded bolt; a swivel mount rotatably mounted on the suction cup; a first turning assembly rotatably mounted on the swivel mount; an arm having one end pivotably formed with the first turning assembly; a second turning assembly including a pivot formed at one end of the arm and adapted to pivot about the first turning assembly; and a mounting seat fixedly formed at the other end of the arm, the mounting seat including a rotatable seat member projected therefrom for securely engaging with a portable electronic device.

The above and other objects, features and advantages of the present invention will become apparent from the following detailed description taken with the accompanying drawings.

DETAILED DESCRIPTION OF THE INVENTION

Referring to FIGS. 1 to 10, a hands-free device in accordance with a preferred embodiment of the invention is shown. The hands-free device comprises a suction cup 1 including a flexible, circular plate 11 having a slightly concave underside adapted to securely fix to a planar surface as known in the art, and a central, threaded bolt 12; and a swivel mount 2 including a circular base 21 including a central hole 24 put on the bolt 12, a plurality of first stubs 25 provided around the hole 24, and a plurality of second stubs 26 having inner threads provided around the hole 24 and alternately provided with the first stubs 25, a central main gear 22 provided in the hole 24 and including outer teeth 221 and a central channel 222 having inner threads threadedly secured to the bolt 12, a plurality of auxiliary gears 23 rotatably provided on the first stubs 25 and adapted to engage with teeth 221 of the main gear 22 in gear engagement, and a ring 20 including a knurled outer surface 27 and inner teeth 28 engaged with the auxiliary gears 23 in gear engagement.

The suction cup 1 further comprises a first turning assembly 3 including a lower disc 31 including a central raised cylinder 312 having a hole, a plurality of recesses 311 provided around the cylinder 312, and a plurality of threaded fasteners (e.g., bolts) 313 driven through the lower disc 31 to threadedly secure into the second stubs 26, an upper disc 32 including a central bottom hole 321 snugly put on the cylinder 312 such that a first pin 91 is adapted to drive through the cylinder 312 into the hole 321 for fastening the discs 31 and 32 together, and a first spring 81 put on the first pin 91 for making the fastening to be a resilient, slidable one, a plurality of projections 322 provided around the hole 321 and engaged with the recesses 311, and two upper risers 323 of rectangular section, and a half spherical cover 33 such that a plurality of threaded fasteners (e.g., bolts) 92 are adapted to drive through the upper disc 32 to threadedly secure into the cover 33, the cover 33 including a cut 331.

The suction cup 1 further comprises a second turning assembly 5 including a pivot 51 formed in the cut 331 and including a plurality of cavities 511 provided as an arc on either side of the cut 331, and two U-shaped grooves 512 on both sides of the cut 331, a bifurcation 52 including two circular boards 521 each including a plurality of through holes 522 arranged as an arc and aligned with the cavities 511, and two shafts 523 extended outward, rotatably provided in the grooves 512, and rested upon the risers 323, two mated cup-shaped members 53 each including a plurality of pegs 531 provided around its periphery and inserted through the through holes 522 into the cavities 511 for releasably securing the bifurcation 52 to the cover 33, and a second spring 54 resiliently anchored between the cup portions of the cup-shaped members 53.

The suction cup 1 further comprises a mounting seat 6 including a circular member 61 including a central hole 60, a positioning member 63 formed on the circular member 61 and including a plurality of protrusions 631 provided around a periphery of an inner surface of the circular member 61, a disc member 62 including a hollow, cylindrical member 65 on a central portion of an inner surface, the cylindrical member 65 provided in the hole 60, a plurality of pairs 64 of ridges 641 and 641' with a valley 642 formed therebetween, the ridges 641 and the valley 642 of one pair 64 adapted to matingly engage with the protrusion 631, and a seat member 66 projected from the disc member 62 for securely engaging with a portable electronic device (e.g., mobile phone) (not shown). A second pin 93 is driven through the hole 60 into the cylindrical member 65 for rotatably fastening the circular member 61 and the disc member 62 together, and a third spring 83 put on the pin 93 for making the fastening to be a resilient one. The suction cup 1 further comprises a hook shaped arm 4 having one end integrally formed with the bifurcation 52 and the other end integrally formed with the circular member 61.

Figures 11, 12:
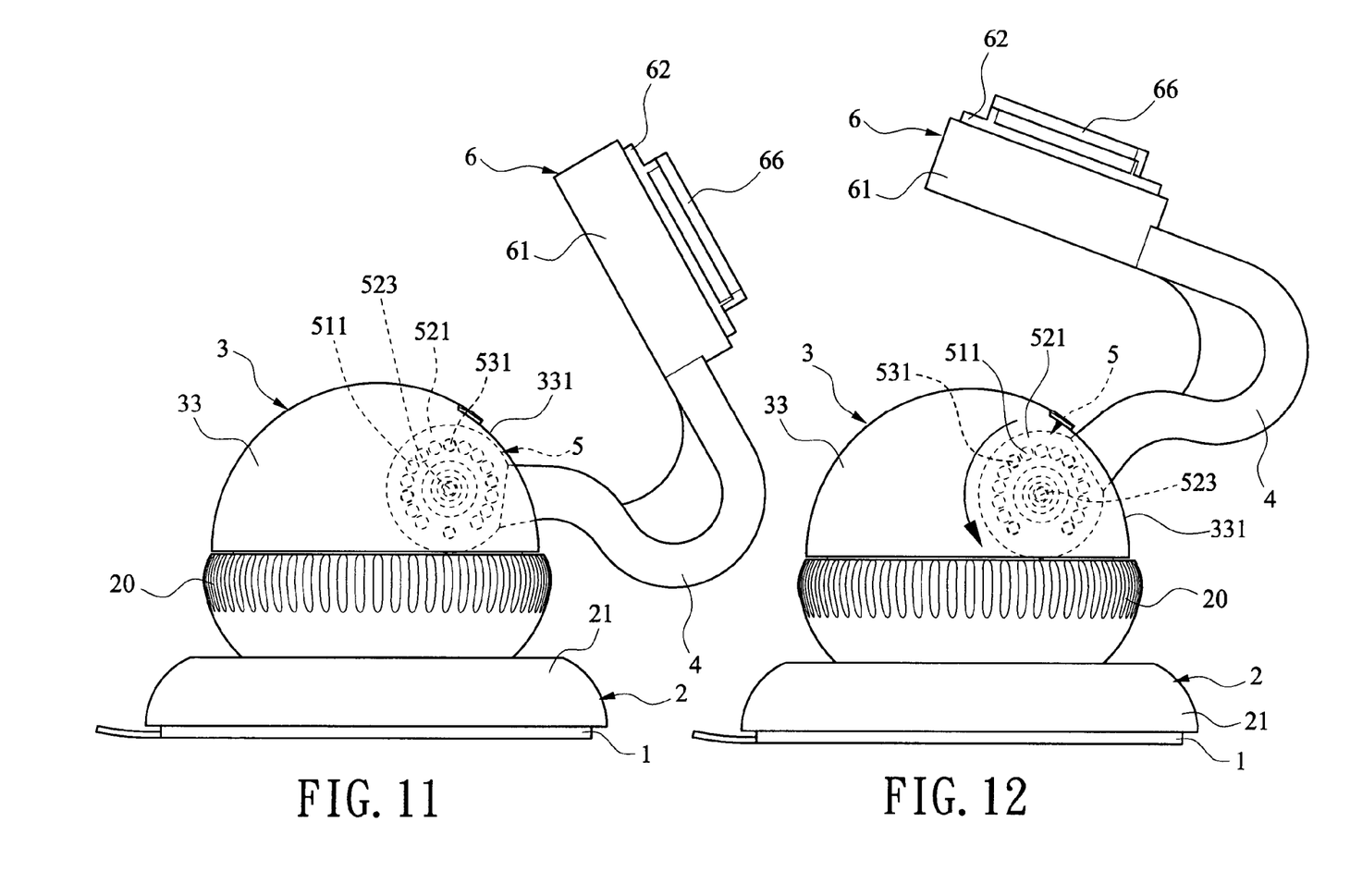
FIG. 11 is a side view of the hands-free device prior to angle adjustment.
FIG. 12 is a view similar to FIG. 11 where the arm is pivoted about the first turning assembly.

Referring to FIGS. 11 to 15, an angle adjustment and positioning operation of the invention will be described in detail below. As shown in FIGS. 11 and 12 in conjunction with FIGS. 7 and 8, a user may hold the arm 4 and pivot same about the cover 33 (i.e., rotate the shafts 523 relative to the grooves 512). Force exerted by the pivoting will force the pegs 531 to temporarily clear the cavities 511 by compressing the second spring 54. Once the pegs 531 clear the cavities 511, the pivoting operation is made possible. The user may continue the pivoting operation until a desired angle of the arm 4 relative to the first turning assembly 3 is obtained. The pegs 531 enter the cavities 511 again for positioning immediately after releasing the pivoting force.

Figure 13:
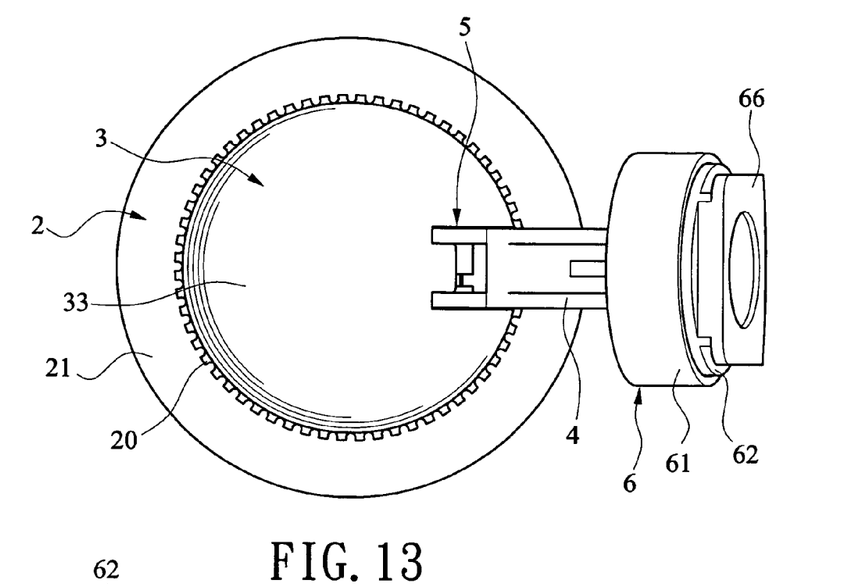
FIG. 13 is a top view of the hands-free device prior to angle adjustment by turning the mount.
Figure 14:
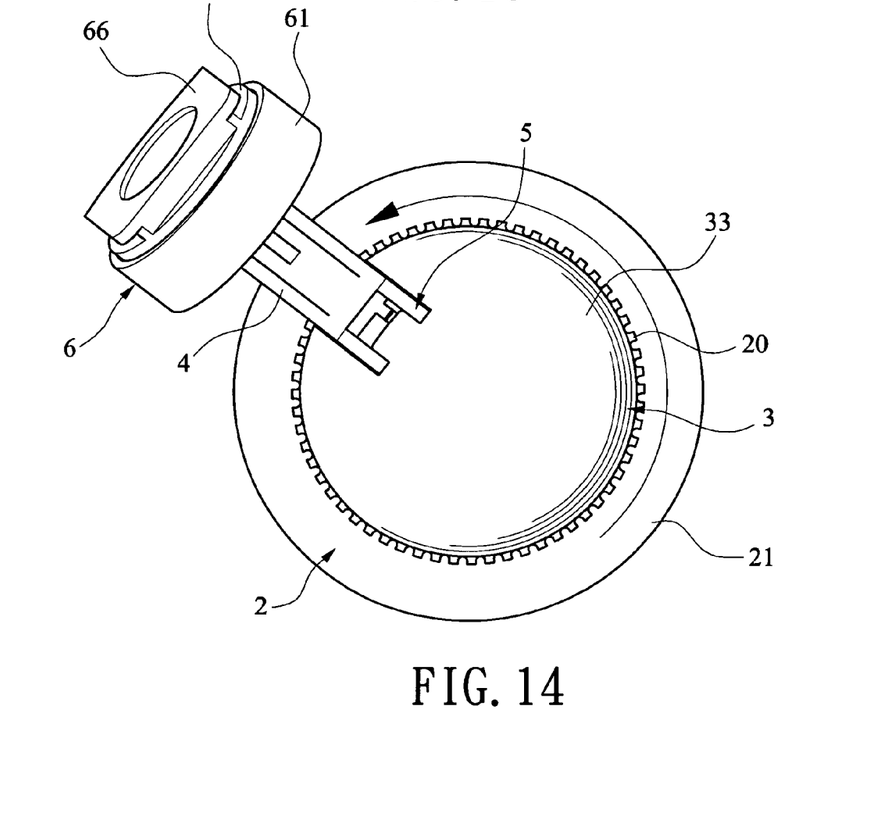
FIG. 14 is a view similar to FIG. 12 where the mount is turning freely.

As shown in FIGS. 13 and 14 in conjunction with FIGS. 4, 5, 6, and 10, the user may lift the cover 33 to disengage the upper disc 32 with the lower disc 31 (i.e., disengage the projections 322 with the recesses 311) with the first spring 81 being compressed. Next, the user may turn the cover 33 freely (see FIG. 5). The upper disc 32 engages with the lower disc 31 (i.e., engage the projections 322 with the recesses 311) again after releasing the lifting force with the first spring 81 expanded (see FIG. 4).

Figure 6:
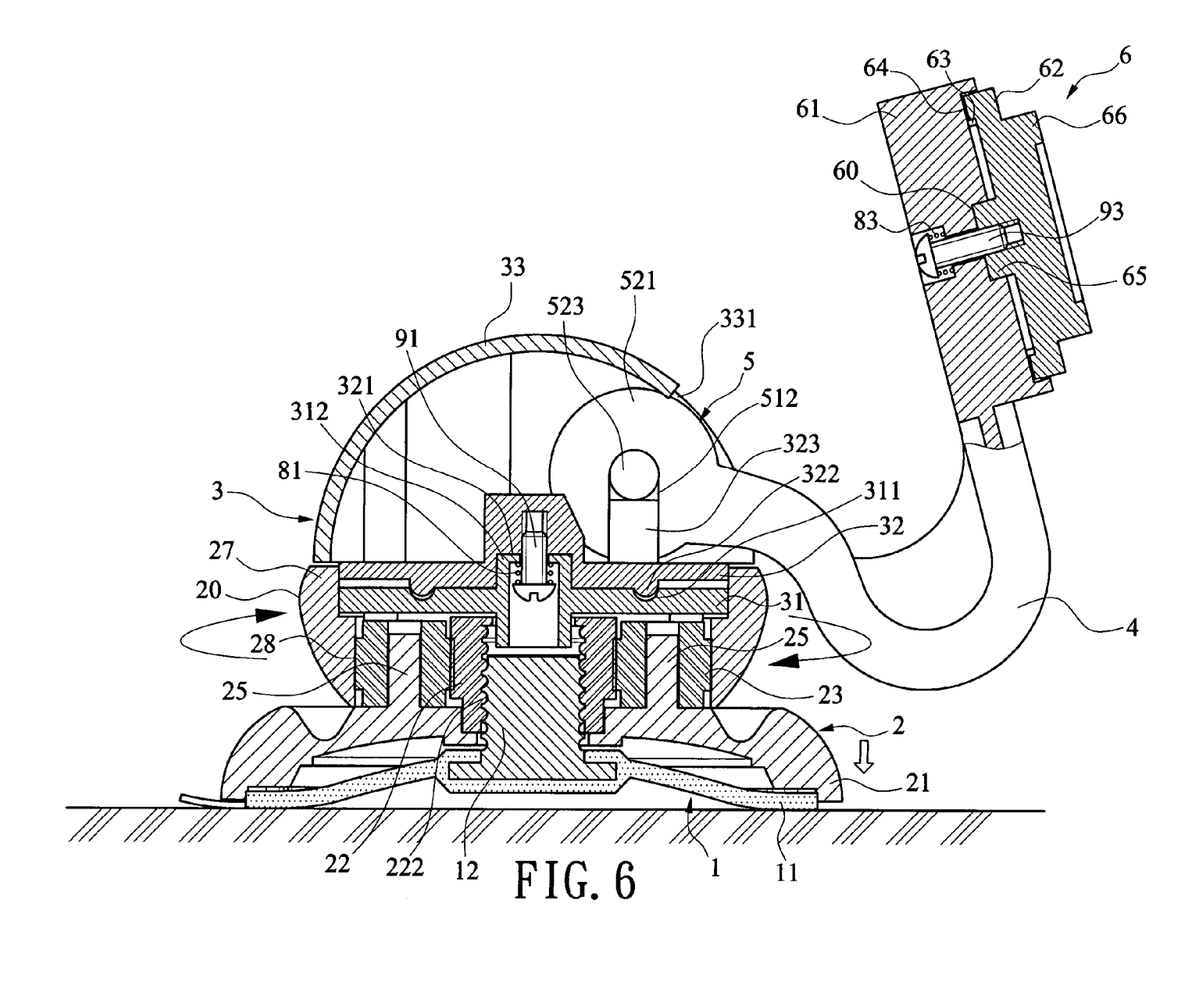
FIG. 6 is a view similar to FIG. 5 where a lower ring of the mount is turning freely.
Figure 7:
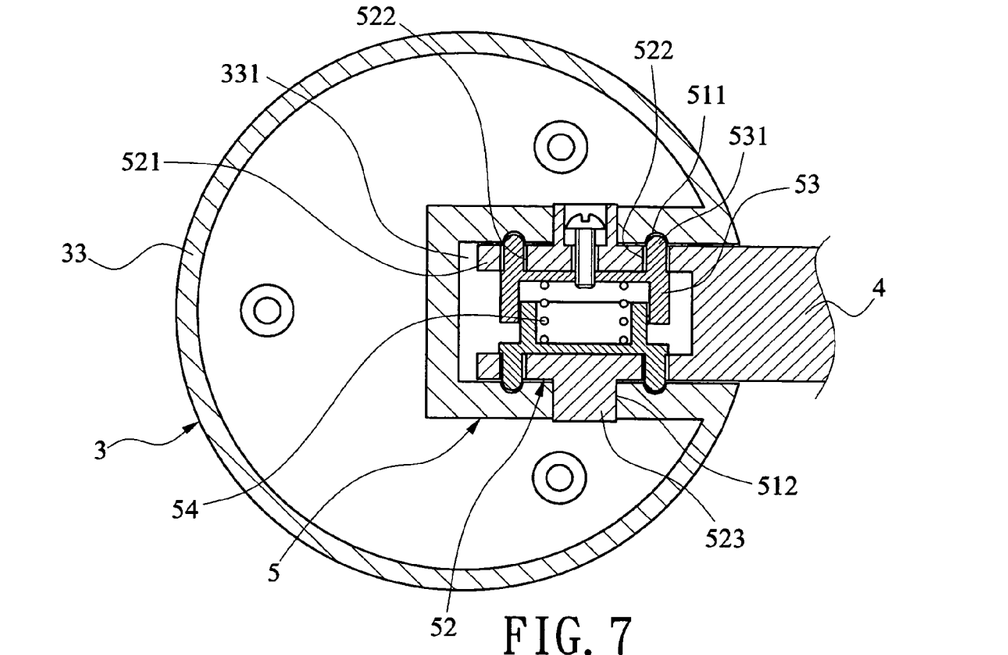
FIG. 7 is a sectional view showing the arm being locked.
Figure 8:
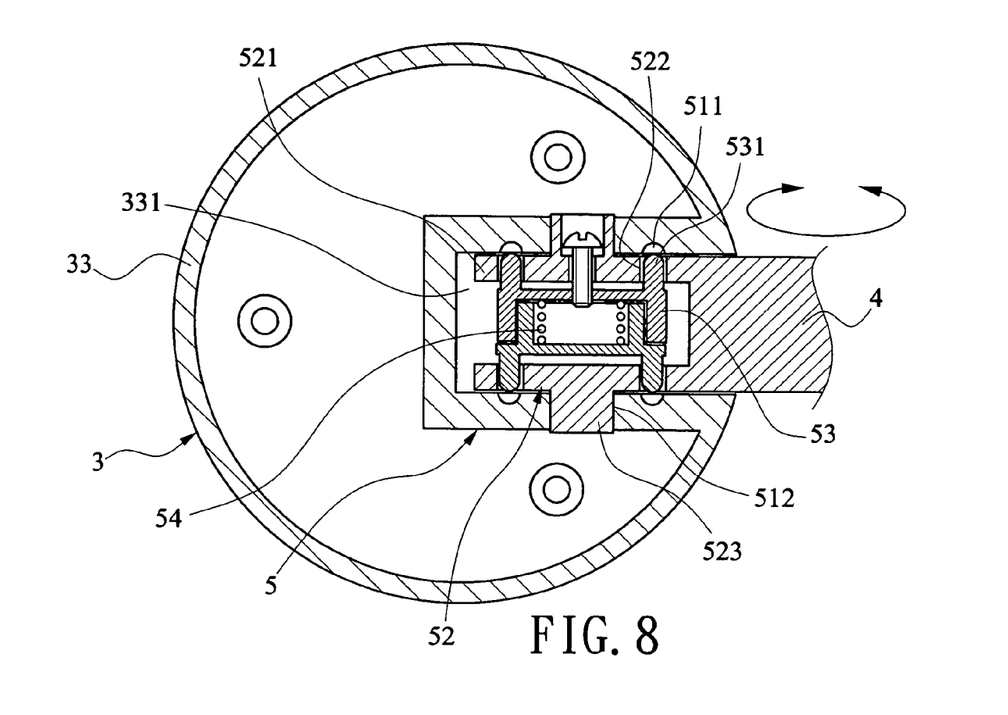
FIG. 8 is a view similar to FIG. 7 where the arm is free to pivot about the first turning assembly by resiliently disengaging therewith.

As shown in FIG. 6, the user may turn the mount 2 and the first turning assembly 3 as a whole freely by turning the ring 20. That is, the turning of the ring 20 will cause the auxiliary gears 23 to turn. The turning of the auxiliary gears 23 also causes the main gear 22 to turn on the bolt 12 for pressing the base 21 and thus the plate 11. As such, air confined between the plate 11 and an attached planar surface is gradually taken until a substantially vacuum is formed (see FIG. 6). It is clear that stopping the turning will position the first turning assembly 3 or both the first turning assembly 3 and the mount 2 immediately.

Figure 1:
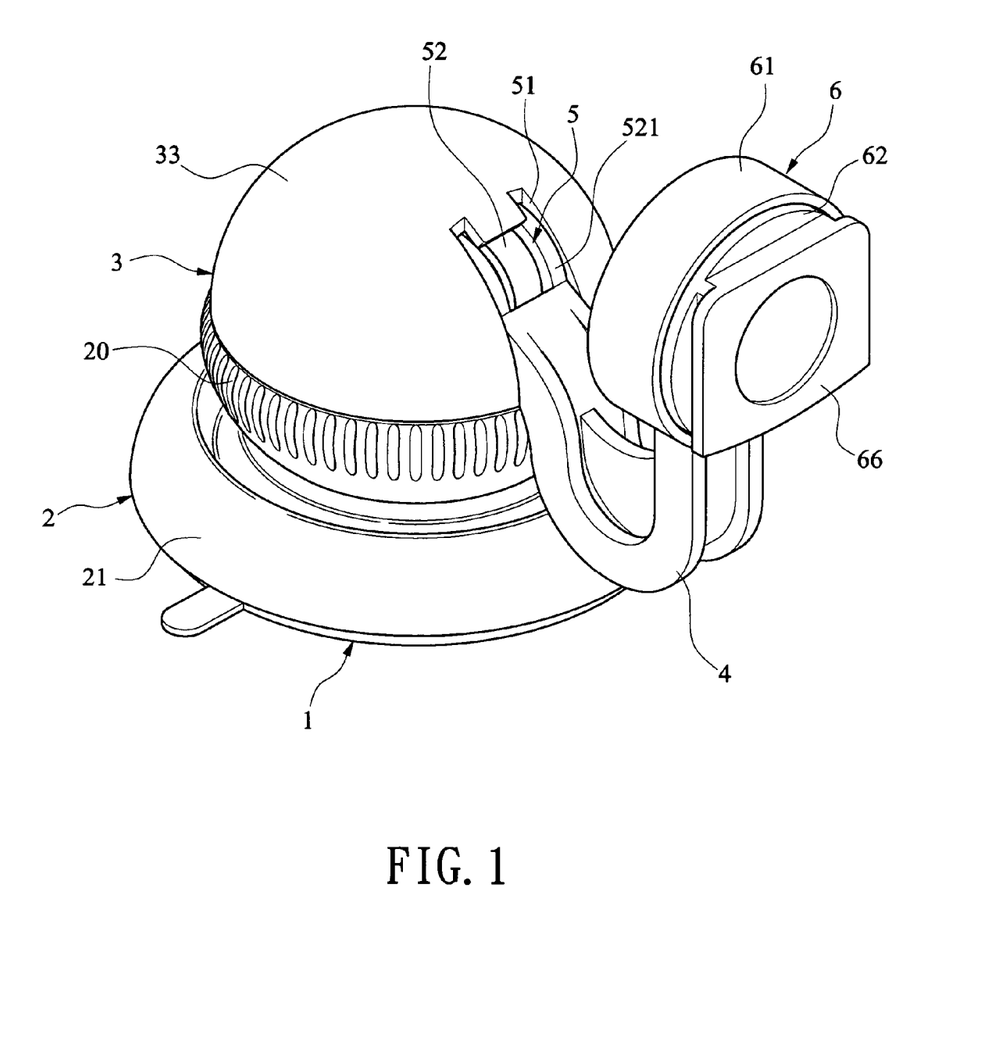
FIG. 1 is a perspective view of a preferred embodiment of hands-free device according to the invention.
Figure 2:
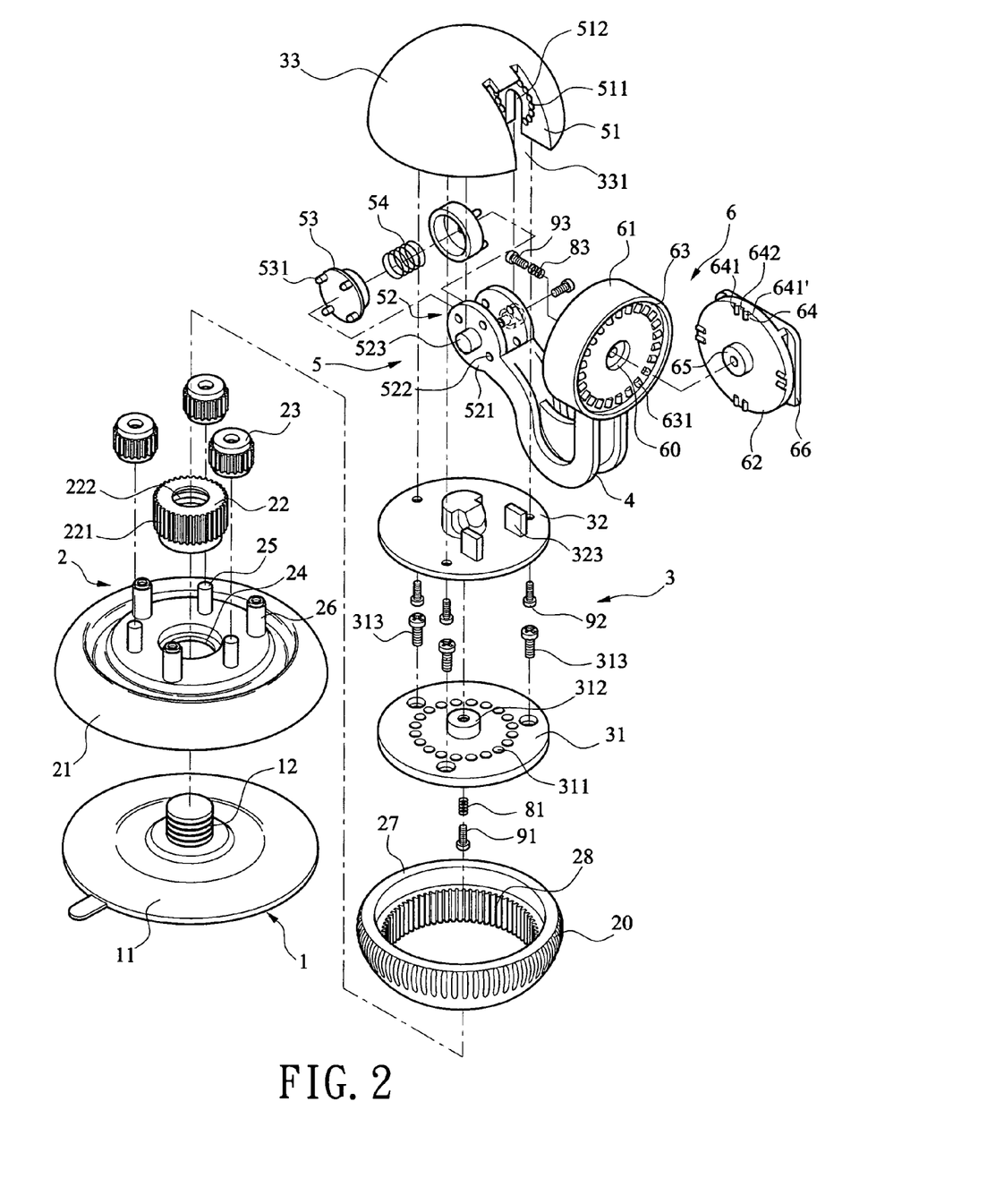
FIG. 2 is an exploded perspective view of the hands-free device.
Figure 3:
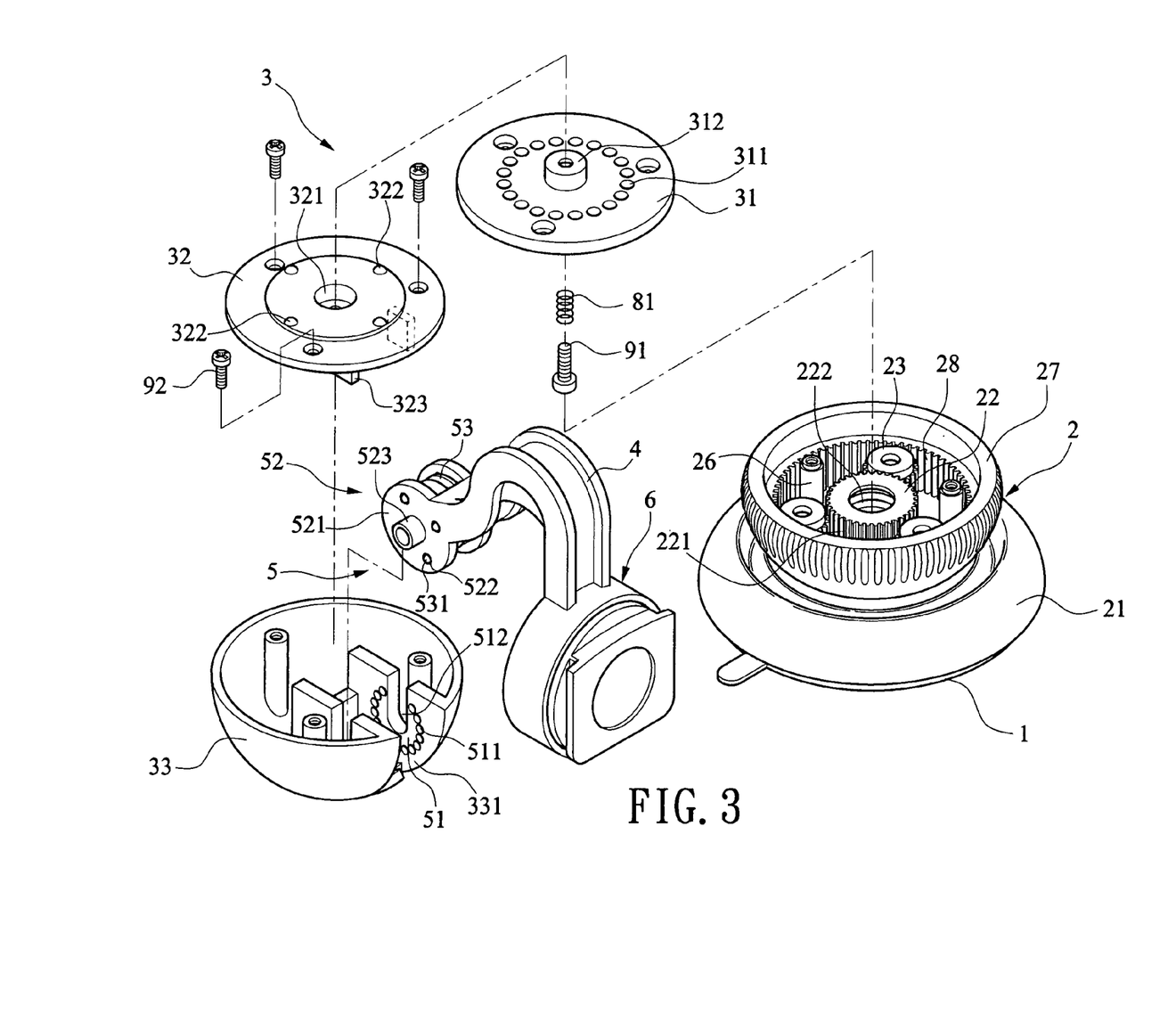
FIG. 3 is a view of the partially assembled the hands-free device in FIG. 2.
Figure 4:
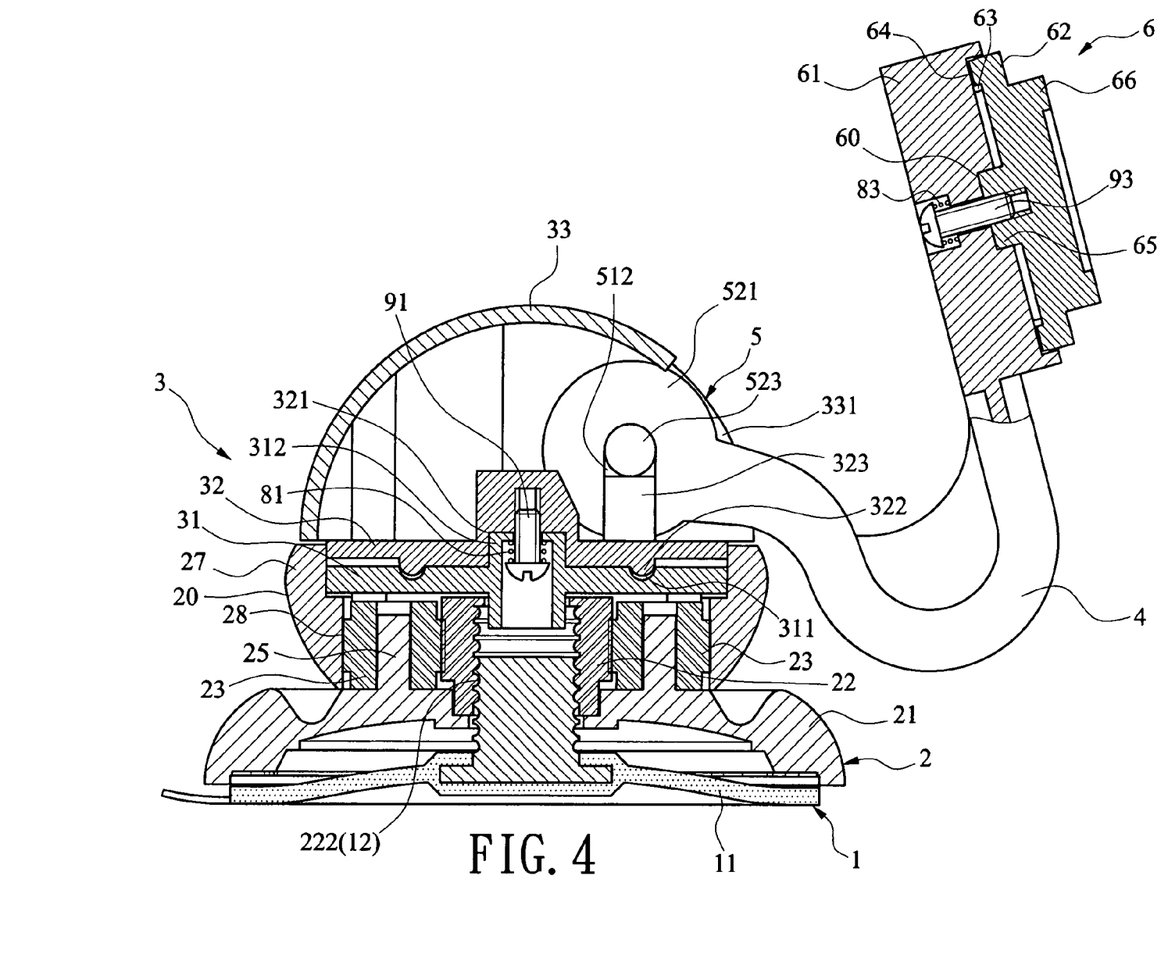
FIG. 4 is a sectional view of FIG. 1.
Figure 5:
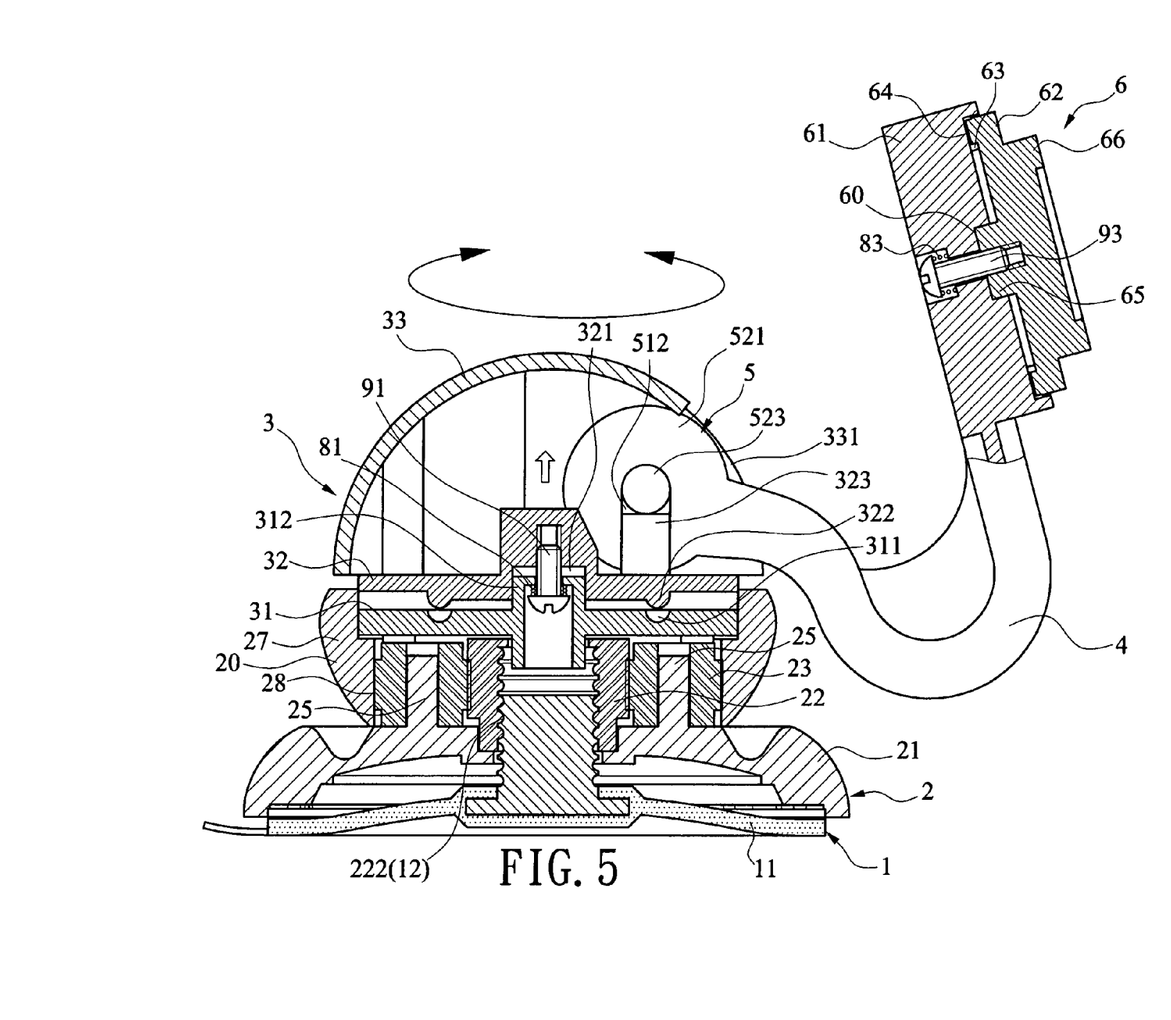
FIG. 5 is a view similar to FIG. 4 where an upper cover of the mount is turning freely.
Figure 9:
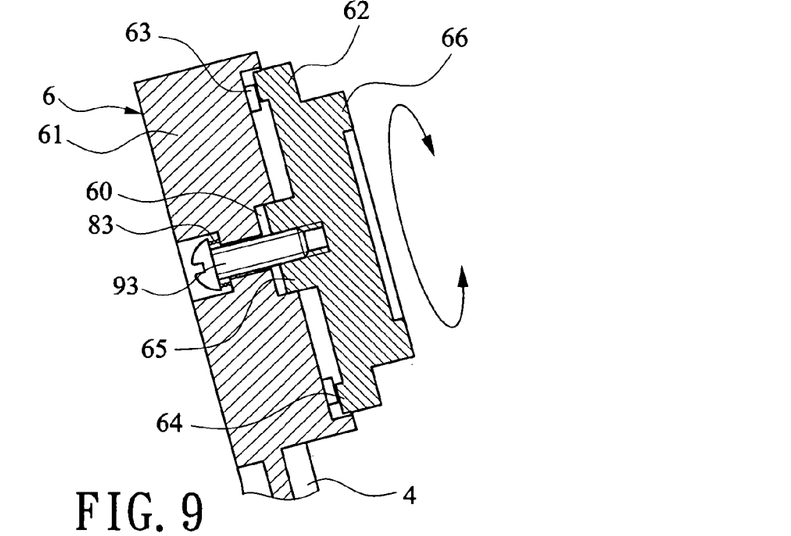
FIG. 9 is a sectional view showing the mounting seat being free to turn.
Figure 10:
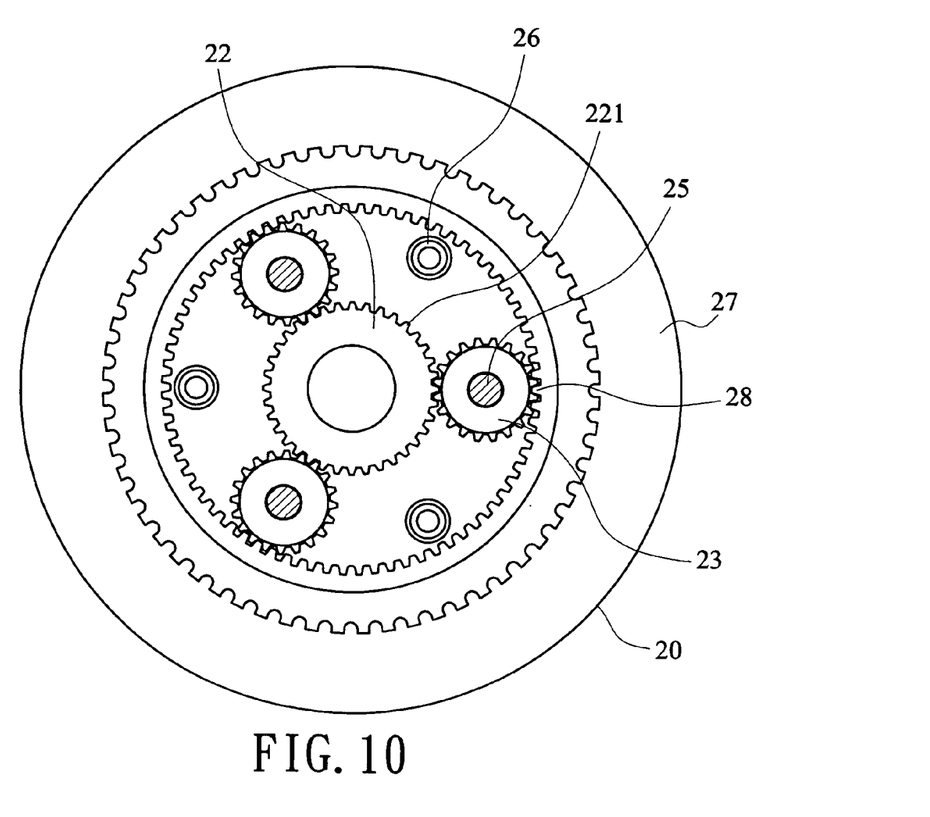
FIG. 10 is a top plan view of the ring and associated gear components.
Figure 15:
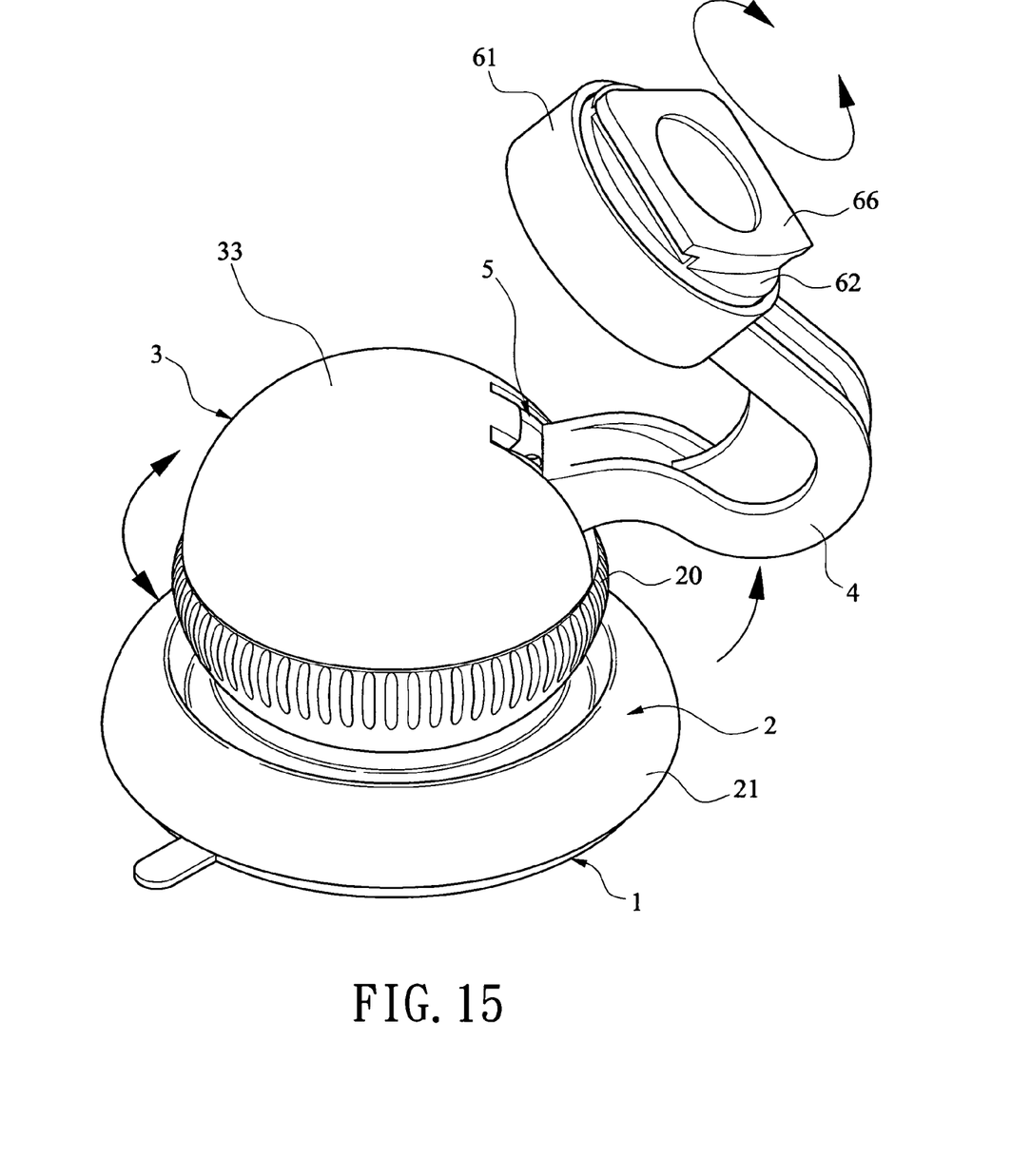
FIG. 15 is a perspective view showing a turning or pivoting state of each of the mount, the arm, and the mounting seat.

As shown in FIG. 15 in conjunction with FIGS. 2, 6, and 9, the user may pull the seat member 66 and thus the disc member 62 to cause the ridges 641 and the valley 642 of the pairs 64 to clear the protrusion 631 with the third spring 83 compressed (i.e., the ridges 641 and the valley 642 of the pairs 64 disengaged with the protrusion 631). Thus, the user may turn both the seat member 66 and the disc member 62 about the circular member 61. It is clear that stopping the turning will engage the disc member 62 with the circular member 61 immediately with the third spring 83 being expanded. That is, both the seat member 66 and the disc member 62 are positioned. It is clear that the invention is capable of adjusting an angle of the mounting seat 6 in any desired direction and positioning the same easily.

While the invention herein disclosed has been described by means of specific embodiments, numerous modifications and variations could be made thereto by those skilled in the art without departing from the scope and spirit of the invention set forth in the claims.

What is claimed is:

1. A hands-free device capable of adjusting an angle thereof toward any desired direction and positioning the same comprising:
   a suction cup (1) including a central, threaded bolt (12);
   a swivel mount (2) rotatably mounted on the suction cup (1);
   a first turning assembly (3) rotatably mounted on the swivel mount (2);
   an arm (4) having one end pivotably formed with the first turning assembly (3);
   a second turning assembly (5) including a pivot (51) formed at one end of the arm (4) and adapted to pivot about the first turning assembly (3); and
   a mounting seat (6) fixedly formed at the other end of the arm (4), the mounting seat (6) including a rotatable seat member (66) projected therefrom for securely engaging with a portable electronic device,
   wherein the swivel mount (2) comprises:
   a base (21) including a central hole (24);
   a central main gear (22) provided in the hole (24) and put on the bolt (12);
   a plurality of peripheral auxiliary gears (23) adapted to engage with the main gear (22); and
   a ring (20) including inner teeth (28) engaged with the auxiliary gears (23) such that turning the ring (20) will cause the main gear (22) to turn on the bolt (12) via a gear transmission of the auxiliary gears (23) for pressing both the base (21) and the suction cup (1) to take air between the suction cup (1) and an attached planar surface away.

2. The hands-free device of claim 1, wherein the swivel mount (2) further comprises:
   a plurality of first stubs (25) provided around the hole (24), and a plurality of second stubs (26) having inner threads alternately provided with the first stubs (25).

3. The hands-free device of claim 1, wherein the main gear (22) comprises a central threaded channel (222) secured to the bolt (12).

4. The hands-free device of claim 2, wherein the first turning assembly (3) comprises:
- a lower disc (31) threadedly secured to the second stubs (26) and including a central, hollow cylinder (312) and a plurality of first engagement elements (311) provided around the cylinder (312);
- an upper disc (32) including a central bottom hole (321), a spring biased pin (91) inserted through the cylinder (312) into the hole (321) for rotatably, slidably putting the upper disc (32) on the cylinder (312), a plurality of second engagement elements (322) provided around the hole (321) and engaged with the first engagement elements (311), and two upper risers (323); and
- a cover (33) secured to the upper disc (32) and including a cut (331) with the pivot (51) formed therein such that lifting the cover (33) will resiliently disengage the second engagement elements (322) with the first engagement elements (311) for enable the cover (33) to turn about the swivel mount (2), and lowering the cover (33) will lockingly engage the second engagement elements (322) with the first engagement elements (311).

5. The hands-free device of claim 4, wherein the first engagement elements (311) are recesses and the second engagement elements (322) are projections.

6. The hands-free device of claim 4, wherein the pivot (51) comprises a plurality of cavities (511) arranged as an arc on either side of the cut (331), and two grooves (512) formed on both sides of the cut (331), and the second turning assembly (5) further comprises:
- a bifurcation (52) including two circular boards (521) each including a plurality of through holes (522) arranged as an arc and aligned with the cavities (511), and two shafts (523) rotatably provided in the grooves (512) and rested upon the risers (323);
- two mated cup-shaped members (53) each including a plurality of pegs (531) provided around its periphery and inserted through the through holes (522) into the cavities (511) for releasably securing the bifurcation (52) to the cover (33); and
- a resilient member (54) anchored between cup portions of the cup-shaped members (53) such that pivoting the arm (4) about the cover (33) will cause the pegs (531) to clear the cavities (511) by compressing the resilient member (54), and stopping the pivoting will cause the pegs (531) to enter the cavities (511) for positioning.

\* \* \* \* \*